United States Patent [19]
Ewers

[11] 3,907,114
[45] Sept. 23, 1975

[54] CIRCULAR BICYCLE RACK
[75] Inventor: Ronald L. Ewers, Litchfield, Mich.
[73] Assignee: Game Time, Inc., Litchfield, Mich.
[22] Filed: Dec. 12, 1973
[21] Appl. No.: 423,993

[52] U.S. Cl. .................. 211/20; 211/22; 211/24
[51] Int. Cl.² .......................................... A47F 7/04
[58] Field of Search .............. 211/5, 17, 18, 19, 20, 211/21, 22, 23, 24, 40, 131; 70/233, 234, 235

[56] References Cited
UNITED STATES PATENTS

| | | | |
|---|---|---|---|
| 636,324 | 11/1899 | Ehrenberg | 211/17 X |
| 3,198,338 | 8/1965 | McCormick | 211/131 X |
| 3,214,029 | 10/1965 | Jack | 211/40 |
| 3,455,461 | 7/1969 | Kesling | 211/21 |
| 3,503,523 | 3/1970 | Hamilton et al. | 211/131 X |

FOREIGN PATENTS OR APPLICATIONS

| | | | |
|---|---|---|---|
| 296,892 | 9/1928 | United Kingdom | 211/21 |
| 867,487 | 8/1941 | France | 211/22 |
| 292,619 | 1/1932 | Italy | 211/17 |
| 947,749 | 8/1956 | Germany | 211/40 |
| 529,823 | 11/1940 | United Kingdom | 211/18 |
| 16,941 | 9/1901 | United Kingdom | 211/17 |

*Primary Examiner*—Roy D. Frazier
*Assistant Examiner*—Thomas J. Holko
*Attorney, Agent, or Firm*—Beaman & Beaman

[57] ABSTRACT

A bicycle rack of circular configuration having a circular outer periphery and a raised inner central region. The bicycle rack is formed of sheet metal and an arcuate concave surface is defined between the outer periphery and central region upon which the bicycle tire rests. Tire retaining means consisting of a pair of spaced parallel rods extending above the concave surface receive the bicycle tire, and positioning means extending downwardly from the rods to the concave surface further aid in positioning the tire upon the rack.

3 Claims, 3 Drawing Figures

CIRCULAR BICYCLE RACK

BACKGROUND OF THE INVENTION

The field of the invention pertains to racks for storing bicycles wherein the bicycle is held in an upright position by the reception of a wheel between a pair of wheel retaining members.

Bicycle racks are commonly employed by schools, parks, and other institutions to encourage the parking or racking of bicycles at predetermined locations, and providing means whereby the bicycle may be held in an upright position and, if desired, locked to the rack. Bicycle racks commonly employ parallel, spaced, wheel retaining members for receiving a front or rear wheel of the bicycle to thereby hold the bicycle in an upright position.

Conventional bicycle racks are of a linear elongated configuration and the wheel retaining elements, such as pipe or conduit, are normally vertically oriented. The bicycles "racked" in such a device are parallel to each other, and in crowded conditions the closeness of the spacing often causes the bicycles to interfere with each other, and makes accessibility to the bicycles difficult.

SUMMARY OF THE INVENTION

It is an object of the invention to provide an attractive, low cost, bicycle rack which effectively holds two-wheel bicycles in an upright position, permits a number of bicycles to be racked in a minimum of space, and provides sufficient spacing between racked bicycles to permit access to the bicycles for mounting, dismounting, and handling purposes.

The bicycle rack in accord with the invention is of a circular configuration, and the racked bicycles are radially disposed with respect to the axis of the rack. The rack comprises a sheet metal base member having a circular outer periphery and a circular central region vertically disposed at a higher elevation than the outer periphery. The sheet metal of the base member is formed in a concave manner to define an arcuate concave surface having a vertical axis of generation passing through the center of the rack. The curve of the concave surface substantially corresponds to the configuration of a bicycle tire, and a bicycle tire rests upon this surface when racked.

The bicycles are maintained in vertical position by a pair of wheel retaining members in the form of rods extending obliquely upward from a point adjacent the intersection of the curved surface and the outer periphery of the rack, to a point adjacent the intersection of the curved surface and a top plate member of the central region. Wheel retaining means in the form of L-shaped brackets extend downwardly from the central regions of the rods affixed to the support surface to prevent the bicycle wheels from being transversely displaced along the concave surface.

As the wheel retaining rods are radially positioned with respect to the axis of the circular rack, the bicycles held by the rods are likewise radially disposed to the rack axis, and this orientation permits sufficient spacing between the bicycles to achieve ready access thereto.

The wheel retaining rods are received within holes defined in the sheet metal base member, and these holes are so related to the other components of the base that the rods are maintained against excessive axial displacement, and the wheel positioning brackets further prevent displacement of the rods. Thus, the rack in accord with the invention is very economically produced, concise in configuration, readily shipped and handled, and may be installed with a minimum of effort.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
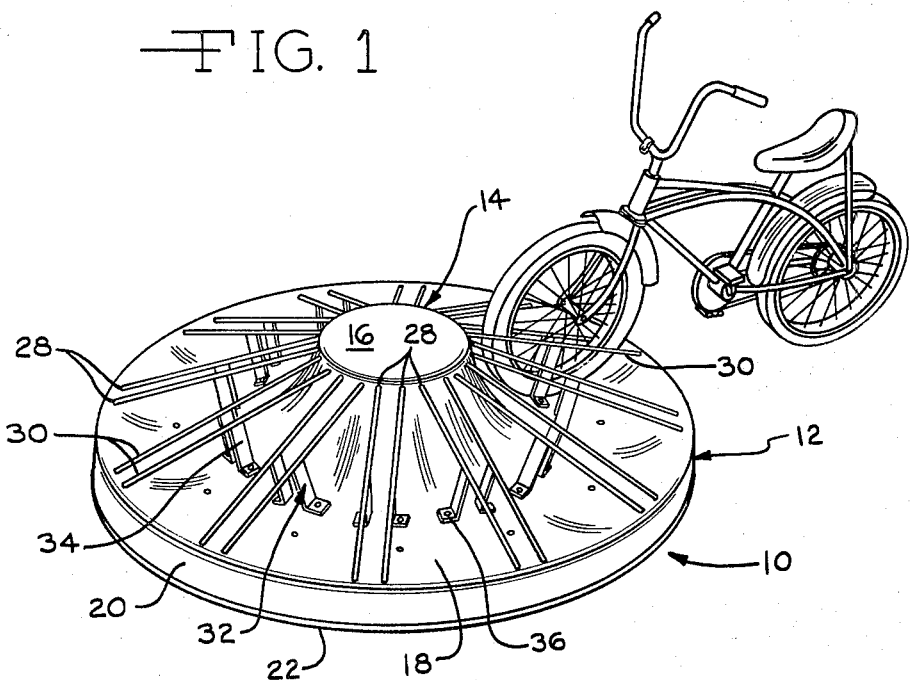
FIG. 1 is a perspective view of a bicycle rack in accord with the invention, a bicycle being illustrated as racked therein.

As will be appreciated from the drawings, the bicycle rack includes a base member 10 which may be formed of galvanized steel in a spinning operation and includes an outer circular periphery 12, a central region 14 having a top flat portion 16, and a concave arcuate surface 18 disposed intermediate the periphery and the central region.

Figure 2:
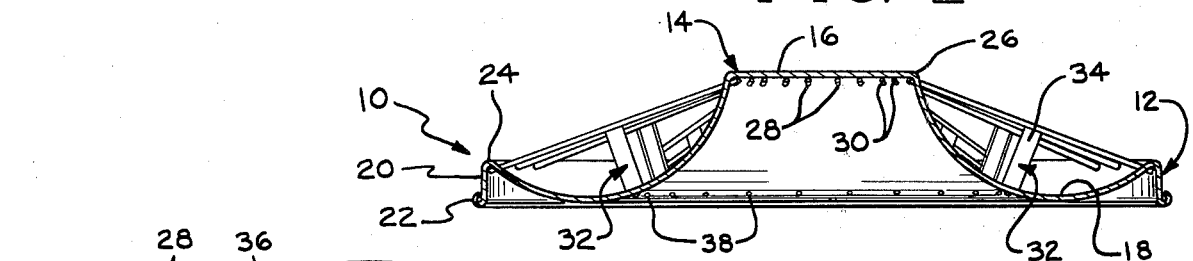
FIG. 2 is a diametrical elevational sectional view as taken along section II—II of FIG. 3.
Figure 3:
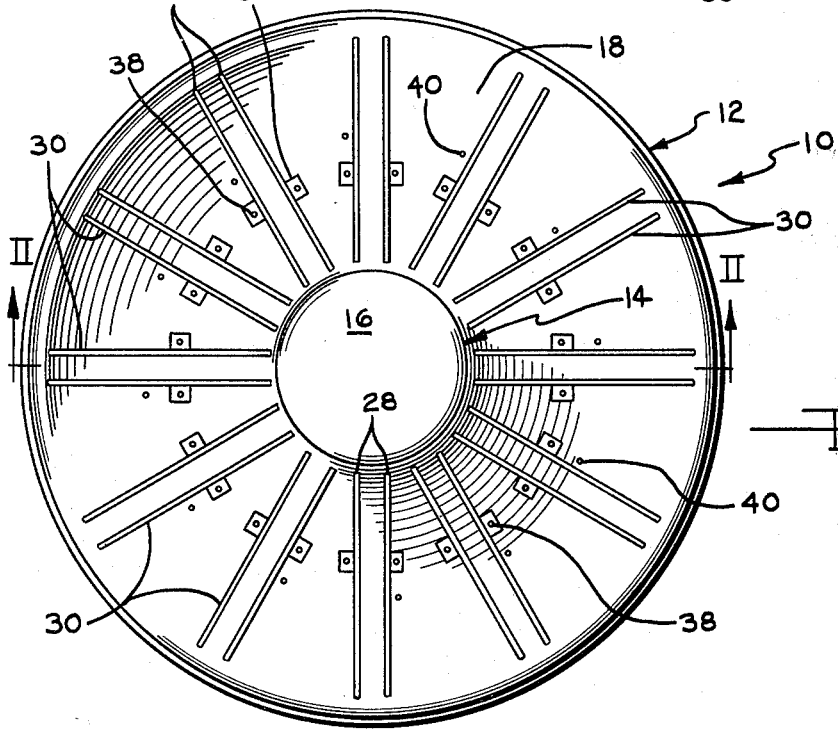
FIG. 3 is a top plan view of the bicycle rack of the invention.

With reference to FIG. 2, the outer periphery 12 consists of a vertically extending flange 20 terminating in an outwardly rolled bead 22, the lower portion of which constitutes the base member surface which engages the supporting surface for the rack.

The concave arcuate surface 18 intersects the flange 22 at the location 24, and the surface 18 extends upwardly terminating at an intersection 26 with the central region portion 16. As will be appreciated from FIG. 2, the central region and top portion 16 are at a substantially higher vertical elevation than the periphery 12 and the flange 20, wherein the portion 16 is well above the flange.

A plurality of holes 28 are drilled in the concave surface 18 adjacent the intersection 24, and also adjacent the intersection 26. These holes are drilled in pairs, and are of a size of a diameter slightly greater than the diameter of the wheel retaining rods 30.

The wheel retaining rods 30 are assembled in pairs to the base member 10 and the holes 28 receiving the rods are so located that the space between a pair of rods is radially disposed with respect to the axis of the bicycle rack. It will be appreciated in FIG. 2 that the rods 30 are of such a length as to be received within the holes 28, and the holes are so located that the rod ends received within the holes adjacent the intersection 24 substantially engage the flange 20, and thus axial movement of a downward direction of the rods is limited. Further, the upper end of the rods 30 received within the holes defined adjacent the intersection 26 will engage the underside of the top portion 16 if the rods are sufficiently shifted upwardly. Of course, for purpose of assembly, the length of the rods 30, and the location of the holes 28, is such that the rods may be inserted in the holes, first into the upper holes adjacent the intersection 26, and then axially slid downward into the lower holes, and in this manner the wheel retaining rods may be assembled to the base member.

To strengthen the wheel retaining rods 30, and to prevent the lowermost portion of the bicycle wheels from being transversely displaced on the concave surface 18, and to insure a vertical orientation of the racked bicycles, tire positioning brackets 32 extend downwardly from the central regions of the rods 30 and are affixed to the concave surface 18.

The brackets 32 include a longer upper end 34 which may be welded to the central region of the rods 30. The lower and shorter end 36 of the L-shaped brackets is provided with a hole for receiving a bolt or rivet 38 which affixes the lower leg of the brackets to the concave surface. Of course, the spacing between the rods 30 and the brackets 32, of a set is such as to maintain a bicyle wheel received within the rods in a vertical manner as illustrated in FIG. 1.

A plurality of drainage holes 40 are defined in the concave surface 18 for preventing the entrapment of water on the support surface.

The radius of the concave surface 18 substantially corresponds to that of the largest diameter bicycle tire and from the aforegoing description it will be appreciated that a bicycle held between a pair of rods 30 will be maintained in a vertical position parallel to associated rods, and thus the racked bicycles are radially disposed to the axis of the bicycle rack. Due to the circular configuration of the rack the spacing between adjacent bicycles is sufficient to permit the rider to easily stand between the bicycles for inserting the same into the rack, or removal therefrom. In a commercial embodiment of the invention 12 bicycles may be readily racked in a rack approximately 5 feet in diameter and 12 inches high. If it is desired to lock the bicycles to the rack, a chain or cable may be threaded through the bicycle wheel and frame, and under the associated rods 30.

The configuration of the rack permits the same to be readily handled and shipped, and a rack of this type may be constructed of substantially less steel than conventional bicycle racks formed of heavy tubing and of a linear form.

Various modifications to the inventive concept may be apparent to those skilled in the art without departing from the scope thereof.

I claim:

1. A bicycle rack comprising, in combination, a sheet metal base member, said base member having a circular outer peripheral region and a concentric circular central region having a center, an annular arcuate concave surface defined in said base member intermediate said peripheral region and said central region having a center of generation at, and symmetrical to, said central region center, said central region including an upper portion disposed at a higher vertical location than said outer peripheral region, a plurality of sets of bicycle wheel retaining rods extending between said peripheral region and said central region upper portion and vertically spaced above said arcuate concave surface, each set comprising a pair of spaced elongated rods each having an upper end supported upon said upper portion and a lower end supported at said peripheral region and a central region disposed above said arcuate surface, and tire positioning members extending between each rod central region and said arcuate surface.

2. In a bicycle rack as in claim 1 wherein said outer peripheral region including a flange intersecting said arcuate surface, and said base member central region upper portion includes a top portion intersecting said arcuate concave surface, wheel retaining member rod receiving holes defined in said arcuate surface adjacent said flange and top portion receiving said rods, said flange and top portion limiting axial movement of said rods within the associated holes.

3. In a bicycle rack as in claim 2 wherein said tire positioning members comprise L-shaped elements having a lower leg affixed to said base member at said arcuate concave surface.

* * * * *